United States Patent Office 3,240,010
Patented Mar. 15, 1966

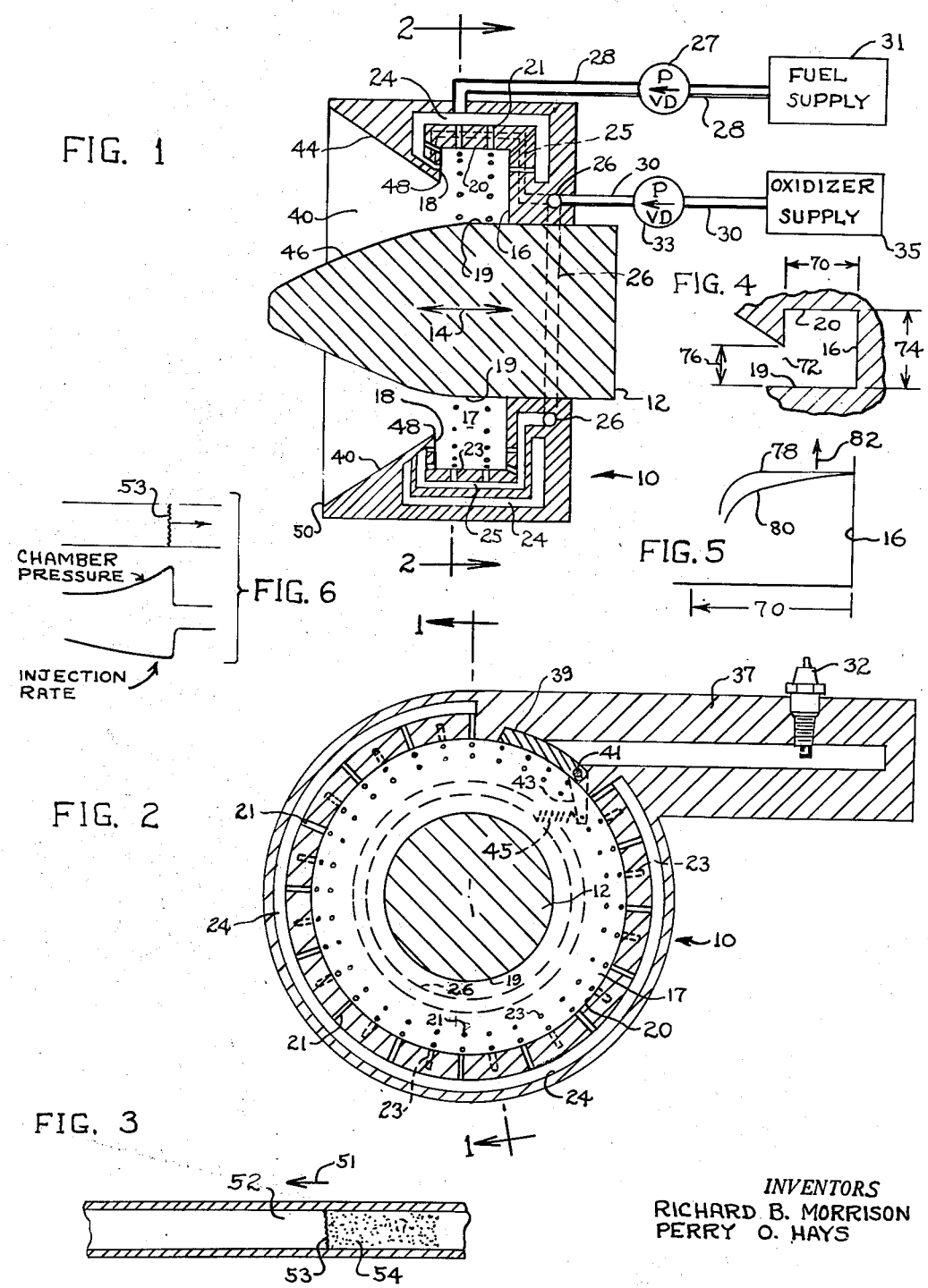
March 15, 1966    R. B. MORRISON ETAL    3,240,010
ROTARY DETONATION POWER PLANT
Filed Feb. 2, 1961
INVENTORS
RICHARD B. MORRISON
PERRY O. HAYS

3,240,010
ROTARY DETONATION POWER PLANT
Richard B. Morrison, Ann Arbor, and Perry O. Hays, Ypsilanti, Mich., assignors to William Doonan, Ypsilanti, Mich.
Filed Feb. 2, 1961, Ser. No. 86,714
5 Claims. (Cl. 60—35.6)

This invention relates to a novel power plant wherein detonative combustion may be effectively utilized and controlled for prolonged periods of time.

The invention concerns means and methods for developing detonative combustion as well as continuing or prolonging it so as to provide sustained power generation. The desired operation may be achieved by carrying out combustion processes in an annular combustion chamber such that detonative waves are caused to travel in an endless path around the chamber and be continuously reinforced by additional combustion reactions necessary for sustaining the wave.

A primary object of the invention is to provide a combustion power plant wherein detonative wave velocities on the order of thousands of feet per second can be achieved for prolonged operational periods.

A further object is to provide a detonative power plant design which, with minimum parts design, is enabled to be utilized to build any of several highly efficient power plants, including ram jet engines, rocket engines, hot gas generators, metal vaporization units, sound generators, or explosive presses.

An additional object is to provide means and methods for controlling and stabilizing detonative combustion processes such that modulated high strength power outputs are obtained without danger of engine blowup or other parts malfunctioning.

A general object of the invention is to provide detonative power plants having stabilized modes of operation over sustained time periods.

Other objects of this invention will appear in the following description and appended claims, reference being had to the accompanying drawings forming a part of this specification wherein like reference characters designate corresponding parts in the several views.

In the drawings:

FIG. 1 is a sectional view of one embodiment of the invention taken on line 1—1 in FIG. 2.

FIG. 2 is a sectional view taken substantially on line 2—2 in FIG. 1.

FIG. 3 is a schematic representation of the conditions existing in a conventional detonative shock tube used for achieving detonative combustion.

FIG. 4 is a view of a portion of the FIG. 1 construction with parts thereof omitted for illustrating the relative dimensions of certain chamber surfaces.

FIG. 5 is a chart illustrating the effects of varying certain dimensions of the FIG. 4 structure.

FIG. 6 is a chart showing the effects on chamber pressure and propellant injection rate caused by passage of the detonative wave in the FIG. 1 embodiment.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the illustrated embodiment (FIG. 1) the power plant of this invention comprises an annular combustion chamber having an annular discharge nozzle opening of reduced area in one end thereof. The arrangement is such that hot gases developed during the detonative combustion process form a rapidly rotating detonative wave traversing around the annular combustion chamber, which is effective in producing high axial thrust such as is desirable for example in a rocket engine. The containment of the gases by the combustion chamber is of advantage in promoting high combustion efficiency and hence high discharge temperatures such as are desirable for example in hot gas generators.

The combustion of homogeneous gas mixtures in conventional engines usually occurs at a rate which is governed by the multiple diffusion process within and in the neighborhood of the flame front. These processes are leisurely, and the propagation rates or flame speeds associated with such combustion are on the order of a few feet per second. In the latter part of the nineteenth century, however, the French physicists Vielle, Berthelot, Mallerd, and Le Chatelier noted, in the course of their investigations with combustible mixtures, that under certain conditions detonative combustion waves were developed which possessed the extraordinary velocities of thousands of feet per second. About 1900 Chapman and Jouguet independently advanced the explanation that such phenomena could be accounted for if these detonation waves were treated as shock waves followed by combustion, the combustion in turn being initiated by the high temperatures accompanying the shock rather than by the diffusion process mentioned above. With the exception of minor alterations and elaborations this theory remains unchanged up to the present.

Referring now to FIG. 3 of the drawings, there is schematically shown a straight elongated shock tube which has been used to duplicate and analyze the resultant effects obtained during the combustion of a homogeneous gas mixture. Numeral 54 represents burned gases, numeral 53 represents the detonation front, numeral 51 represents the direction of wave travel, and numeral 52 represents unburned gases.

The combustion at 54 and the wave speed at 53 will vary depending on the character of the burning process and the character of the unburned gases. When the pressure and density of the unburned gases (zone 52) are greater than the pressure and density of the burned gases (zone 54) there will be a leisurely processes usually defined as deflagrative combustion. When the pressure and density of the unburned gases are less than the pressure and density of the burned gases there will be a rapid combustion process which is generally termed detonation. The two types of combustion may be expressed in the following equations, where P is pressure, and V is specific volume (i.e. reciprocal of density):

$$\left.\begin{array}{c}P_{52}<P_{5}\\V_{54}<V_{52}\end{array}\right\} \text{tonation}$$

$$\left.\begin{array}{c}P_{52}>P_{54}\\V_{54}>V_{52}\end{array}\right\} \text{Deflagration}$$

The above equations are discussed at greater length in the published report in 1955 of the Engineering Research Institute, University of Michigan, entitled "A Shock Tube Investigation of Detonative Combustion," by Richard B. Morrison, one of the coinventors of the present invention. This report contains further information of value in connection with the study of detonative combustion. However the report is very lengthy and the contents of the report are therefore not reproduced here.

Referring now to FIGS. 1 and 2 of the drawings, there is shown a rotary detonation wave rocket engine, including a casing or block mechanism 10 having a plug 12 therein which is preferably mounted for limited axial adjustment in the arrow 14 direction, as by forming the casing mechanism and plug with cooperating keys and keyways or meshing threads (not shown). A suitable control apparatus is preferably utilized to adjust the plug 12 in its arrow 14 movement. In general the plug is adjusted to the left (FIG. 1) during start-up and is adjusted back and forth to the right and left during normal operation.

Casing mechanism 10 is provided with an internal radially extending annular surface 16, a second internal radially extending annular surface 18, and an interconnecting axially extending peripheral surface 20. The peripheral surface 19 of plug 12 cooperate with the above-mentioned surfaces to form an annular combustion chamber 17. Mechanism 10 is internally contoured to define a conical surface 44 which joins surface 18 at juncture 48. The space between juncture 48 and the peripheral surface 19 constitutes the opening for the discharge nozzle generally designated by numeral 40.

In the illustrated embodiment combustion chamber 17 is provided with a series of propellant supply orifices 21 and 23 extending through each of the chamber surfaces 16, 18, and 20. Orifices 21 extend from a peripheral fuel supply duct 24, and orifices 23 extend from radially directed oxidizer supply ducts 25 which connect with an annular oxidizer inlet chamber 26. Fuel duct 24 connects with a supply passage 28, and chamber 26 connects with an oxidizer supply passage 30.

Line 28 is provided with a variable delivery pump 27 for delivering fuel from source 31 to duct 24. Similarly line 30 is provided with a variable delivery pump 33 for delivering oxidizer from source 35 to chamber 26.

The illustrated engine can be supplied with any of several liquid or gaseous fuels, as for example liquid hydrogen, aniline, ethanol, furfural alcohol, gasoline, hyrazine, kerosene, methanol, or turpentine. Oxidizer passage 30 can be supplied with various oxidizer materials, as for example hydrogen peroxide, oxygen, or fuming nitric acid. If desired the fuel and oxidizer may be merged prior to entry into the combustion chamber to promote better mixing. The fuel-oxidant combination should be of non-hypergolic character.

The illustrated engine is constructed as a bi-propellant structure, i.e., a structure wherein the fuel and oxidizer are separate from one another. However the invention is also applicable to engines using mono-propellants or pre-mixed propellants, i.e., single liquids that contain both the oxidizer and the fuel. Suitable mono-propellants with or without catalyst are ethylene oxide, hydrogen peroxide, nitro methane, and normal propyl nitrate. When the invention is utilized with mono-propellants one of the supply ducts 24 or 26 may be omitted, and the propellant admitted only through one set of nozzle orifices.

For starting purposes a conventional spark plug 32 may be employed. The location of the spark plug is not critical but in the illustrated embodiment it is located within a straight tubular duct 37 formed as an extension of casing 10. Preferably duct 37 has a length approximately twenty times its internal diameter to facilitate the development of a high velocity wave front during start-up of the engine. Auxiliary fuel and oxidizer lines (not shown) may be utilized to supply a combustible mixture to the plug at starting.

The engine could be started by pressure ignition, as by providing a cartridge-firing mechanism directed to discharge directly into and through the annular combustion chamber. The system would of course be pre-charged with propellant so that the shock wave developed by the fired cartridge would ignite the propellant to thus start the rotary detonation wave in the annular chamber.

Detonation requires a propellant charge in the area adjacent the detonation front. Therefore in the illustrated construction starter duct 37 may be provided with a closure 39 for holding the initial charge in the duct at initial firing of the plug. The closure may be swingably mounted on a pivot shaft 41 which extends outwardly of casing 10 to connection with an arm 43. An external tension spring 45 of suitable length may be connected to arm 43 to hold closure 39 closed during initial charging.

At fire-up the closure 39 is forced open by the combustion pressure, and the flame and/or detonation front then advances into the annular chamber 17. The opening movement of closure 39 may be employed to cut off flow to the starter duct 37, as by equipping the auxiliary fuel line with a control valve and connecting same with arm 43.

It will be appreciated that after start-up control of the combustion process can be achieved by controlling the injection characteristics such as by operation of pumps 27 and 33 or other propellant feed techniques. Thus, the pumps may be operated to individually control the quantities of vaporized fuel and oxidizer existing at any one instant in front of the detonation wave front. The actual operation of the rotary detonation power plant involves initial charging of the combustion chamber by pumps 27 and 33, followed by ignition of the charge. The developed detonation wave is propagated past the fuel-oxidizer orifices, and the pumps are continued to be operated to maintain a desired fuel injection rate into the chamber.

Control of the detonation wave speed and power generation may be effected by controlling the pumps. In general, the detonation wave velocity is controlled by the fuel-oxidizer ratio. Different propellants and combustion chamber capacities will necessitate different propellant injection rates for a given detonation wave velocity. However the rates can be determined for each desired situation by suitable flame and/or detonation tube tests as explained in the aforementioned published report. It will be understood that modulation of the detonation wave velocity can be achieved by selective control of the pumps.

As envisioned herein a detonation wave traverses the annular chamber which is relieved axially on one side by the nozzle opening 40. If the relief were sufficiently severe (i.e., if wall surface 18 were eliminated) the wave could under certain conditions be extinguished. Therefore there is preferably only a partial nozzle relief as shown at 48 in the drawings. The nozzle 40 configuration as shown is conventional to rockets and provides an adequate geometry for the development of thrust. Full utilization of the issuing gas from the detonative process depends on the nozzle configuration; hence in actual practice the nozzle configuration may vary somewhat from that shown in the drawings in order to provide high efficiencies.

Rotary detonation as herein conceived differs from conventional rocket motor combustion in the following respects:

(1) The combustion process is accomplished by a detonation process rather than a deflagration process.

(2) The detonative combustion wave rotates around an annular slot or chamber 17 whereas in a conventional rocket a deflagrative wave front is stabilized in a plane perpendicular to the motor axis.

(3) In detonative combustion the gas expansion takes place in a plane parallel to the wave and transverse to the wave motion whereas in a conventional rocket the expansion is perpendicular to the deflagration front.

(4) In rotary detonation the propellant feed, although continuous for the overall system can fluctuate locally due to the passage of the wave. By comparison, in a conventional rocket the propellant flow through each injector hole is essentially constant with time.

(5) In detonative combustion the pressure at any point in the motor chamber fluctuates widely but in a regular and very reproducible manner that can be controlled by the lateral relief supplied by the opening at 48 whereas the pressure at a given point in a conventional rocket is essentially constant.

(6) The rotational speed of the burned propellant gases immediately behind the detonation wave is high (e.g.

1000 to 4000 feet per second) diminishing rapidly as the trailing rarefraction wave expands these gases, whereas there is little rotational velocity in the gases of a conventional rocket motor.

(7) More than one definable detonative combustion front can be employed whereas a conventional rocket motor is usually identified with one combustion front that of deflagration.

(8) The inertial character of the highly convective flow immediately behind the detonative combustion front can be used to help stabilize the detonation process by curvature of the wall into the direction of wave motion. Such wall configurations are not utilized for this purpose in a conventional rocket motor.

(9) In detonative combustion materially higher propellant injection rates are employed than in the case of conventional rockets.

(10) The performance of the rotary detonation wave engine is highly insensitive to the usual rocket instabilities and rough combustion phenomenon.

(11) The motor center body of the rotary detonation wave engine is provided as an aid to stabilizing the rotary detonation phenomenon and not for the purpose of providing a better performance range as in the case of a conventional rocket "plug nozzle." The rotary wave engine would, however, benefit from the "plug" design in those cases wherein it is employed to provide a better performance range.

(12) The propellant feed to the rotary wave engine can be programmed to selected portions of the injector face (as by appropriate valving or pump arrangements), whereas such programming to a conventional motor would not produce thrust vector control except in a direction parallel to exhaust gas flow. Gimballing of the motors is a usual technique in conventional rocket motors that is not required with the rotary detonation wave engine.

(13) Propellant feed programming to the rotating detonation wave can be varied at a fixed fuel-oxidizer ratio to vary the amount injected at a point or it may be programmed differentially by charging fuel-oxidizer ratios to effect wave velocity and the pressure levels behind the wave. Any or all of these in combination would be used for thrust vector control.

(14) In the rotary detonation engine the velocity of the detonation wave and therefore the burning rate, can be varied over a considerable range by control of the mixture ratio of the particular fuel and oxidizer used. This then will provide for various thust levels from one particular size engine.

Referring now to FIGS. 4 and 5, there is shown in schematic form the cross section of the annular combustion chamber and the effects of varying the relative dimensions thereof. The axial cross section dimension 70 in FIG. 4 (from the back injector face 16 to the relief throat), in combination with the relief throat opening 72, controls the overall operating pressure of the motor and the motor's ability to stabilize the detonation wave. The combustion chamber cross sectional area (dimension 70 times dimension 74) divided by the relief area (dimension 76) will influence motor performance to a large extent. These dimensions are therefore matched to the propellants utilized. The relief throat 72 will control to a degree the shape of the detonation front, with small reliefs (i.e. small values of dimension 76) giving wave profiles corresponding to curve 78 (FIG. 5) and large reliefs giving wave profiles corresponding to curve 80.

Referring especially to FIG. 5, there are schematically shown the two waves or fronts numbered 78 and 80. Wave 78 is for an engine having a relatively small value for dimension 76, and wave 80 is for an engine having a relatively large value for dimension 76. The wave fronts are assumed to travel in the arrow 82 direction, with gas expansion taking place normal to the direction of wave travel, i.e. along the respective line 78 or 80. It will be seen that wave 78 produces gas expansion normal to chamber surface 16 more rapidly than wave 80, which produces such normal expansion for only a small value of dimension 70. Wave 78 is a stronger detonative front than wave 80 due to the small relief obtained by the dimensioning of throat opening 72.

It should be noted that there will exist for any particular propellant combination utilized a critical minimum for the dimension 70, below which for a given dimension 76 a rotary detonation wave will not be sustained in the motor. For example where dimension 74=dimension 76=3/8 inches, dimension 70 should exceed approximately 1/4 inch for stoichiometric hydrogen-oxygen mixtures at atmospheric pressure in order to sustain a detonation wave. Other conditions will require different dimensions.

The various injector orifices (FIGS. 1 and 2) provide metering of the fuel, atomization of liquids if used, and in the case of thrust vector control, differential metering. In order to provide high propellant feed rates the total area of the injector holes is large. Propellant flows through an injector port can be time variant, being minimum (or even zero) just after the passage of the detonation wave. The timing of injection for the latter case of time variant injection is inherent to the system, the pressure history of the detonation wave determining the rate of injection. FIGURE 6 illustrates in chart form the conditions at the passage of the detonation wave. It will be noted that the chamber pressure increases to a maximum as the detonation wave passes, after which it falls off. The injection rate varies as described.

It is usual in conventional rockets to maintain an injector pressure upstream of the injector port at least 25% above the combustion chamber pressure in order to alleviate instabilities in the rocket motor. This limitation is not present in the rotary detonation wave engine. It may be desirable from the standpoint of high propellant feed rates to the rotary detonation wave engine to supply high injection pressures but not because of the usual chamber instabilities.

Conventional rocket motors locate the injectors at the head of the motor away from the exhaust. It is anticipitated that the rotary detonation wave engine will employ in many applications injection through all faces of the combustion chamber walls.

The rotary detonation wave engine center body 12 provides for containment of the wave on its surface. In larger engine applications this center body may be eliminated, providing for lateral expansion of exhaust gases radially toward the axis of the motor as well as axially rearward. The radial expansion would be deflected finally in an axial rearward direction. In this case a virtual center body or core would be formed by an imaginary surface radially inwardly of which there would be no unburned propellant. The imaginary surface would correspond with the physical surface 19 shown in FIG. 1. The general configuration of the motor need not be cylindrical as long as the combustion chamber channel closes on itself in order to provide a continuous path for the detonation wave. It is felt that cylindrical chambers will be very practical for most uses.

The above description has proceeded on the basis of utilizing the invention in rocket engines wherein the fuel and oxidizer are contained with the power plant. It is contemplated that the invention can also be utilized in ram-jet engines and turbo-jet engines wherein the oxidizer is gathered from the atmosphere and delivered to the power plant, either compressed as in a turbo-jet or partially compressed as in a ram-jet. The invention as applied to a turbo-jet or ram-jet engine would of course necessitate changes in the proportion of parts and chamber design, as for example for introduction of cooling air, dilution air, etc.

As previously indicated, the invention has other applications, as in hot gas generation. In such an application the engine components would of course be fixedly mounted and the hot gases could be discharged from the nozzle 40 over a suitable heat exchanger (not shown).

It will be understood that while the invention has been described by reference to a particular embodiment, nevertheless certain changes and modifications may be resorted to without departing from the spirit of the invention as set forth in the appended claims.

We claim:

1. In the art of operating a combustive power plant comprised of a combustion chamber having an endless peripheral wall surface, opposed end wall surfaces extending inwardly therefrom, and a plug extending through one of the end wall surfaces to cooperate with the other end wall surface in defining an annular exhaust opening; the step of pressure injecting propellant into the combustion chamber to establish and maintain a chamber condition wherein the pressure of the unburned gases is less than the pressure of the burned gases and the specific volume of the unburned gases is greater than the specific volume of the burned gases, and the second step of introducing at least one high velocity shock wave tangential to said peripheral wall surface to initially ignite said propellant, whereby at least one detonation wave is caused to move along and around the peripheral wall surface in a closed path, with the detonation wave gases being exhausted through the exhaust opening in a direction perpendicular to the direction of wave motion.

2. In the art of operating a combustive power plant comprised of a combustion chamber having an endless peripheral wall surface, opposed end wall surfaces extending inwardly therefrom, and a plug extending through one of the end wall surfaces to cooperate with the other end wall surface in defining an annular exhaust opening; the step of pressure injecting propellant into the combustion chamber through each of said wall surfaces to establish and maintain a chamber condition wherein the pressure of the unburned gases is less than the pressure of the burned gases and the specific volume of the unburned gases is greater than the specific volume of the burned gases, and the second step of introducing at least one high velocity shock wave tangential to said peripheral wall surface to initially ignite said propellant, whereby at least one detonation wave is caused to move along and around the peripheral wall surface in a closed path, with the detonation wave gases being exhausted through the exhaust opening in a direction perpendicular to the direction of wave motion.

3. In the art of operating a combustive power plant comprised of a combustion chamber defined by an endless peripheral wall surface, opposed end wall surfaces extending inwardly therefrom, and an axially movable plug extending through one of the end walls into the space circumscribed by the other end wall to form an annular discharge nozzle; the first step of pressure injecting propellant through each of said wall surfaces at a plurality of very closely spaced points, and the second step of introducing at least one high velocity shock wave tangential to said peripheral wall surface to initially ignite said propellant, so as to establish and maintain at least one rotary detonation wave movable around the plug along the peripheral wall surface, and the third step of moving the plug axially to provide a controlled lateral relief for the detonation wave exhaust gases in a direction perpendicular to detonation wave motion.

4. In a detonative combustion power plant the combination comprising a chamber-forming housing including a continuous peripheral side wall, opposed annular end walls extending inwardly therefrom, and an axially movable plug extending through one of said end walls into the space circumscribed by the other end wall; the space between the two end walls constituting a combustion chamber, and said other end wall extending inwardly from the peripheral wall a lesser distance than said one end wall so as to cooperate with the plug in forming an annular discharge nozzle for the combustion chamber; means forming a series of propellant feed passages discharging at closely spaced points in each of said peripheral side wall and annular end walls for feeding the combustion chamber with sufficient propellant to sustain at least one rotary detonative wave movable circumferentially around the plug; and means for introducing a high velocity shock wave tangentially to said peripheral wall surface to initially ignite said propellant.

5. In a detonative combustion power plant, the combination comprising a chamber-forming housing structure including a continuous peripheral side wall, opposed annular end walls extending inwardly therefrom, and an axially movable plug extending through one of said end walls into the space circumscribed by the other end wall; the space between the two end walls constituting a combustion chamber, and said other end wall extending inwardly from the peripheral wall a lesser distance than said one end wall so as to cooperate with the plug in forming a discharge nozzle for the combustion chamber; means forming an annular propellant feed passage surrounding each of said side wall and annular end walls; closely spaced propellant discharge passages extending from said feed passage through each of said peripheral side wall and end walls for feeding the combustion chamber with sufficient propellant to sustain at least one rotary detonative wave movable circumferentially around the plug; and means for introducing a high velocity shock wave tangentially to said peripheral wall surface to initially ignite said propellant.

References Cited by the Examiner

UNITED STATES PATENTS

| 2,445,856 | 7/1948 | Mayer | 60—35.6 |
| 2,465,525 | 3/1949 | Goddard | 60—35.6 |
| 2,555,081 | 5/1951 | Goddard | 60—35.6 |
| 2,602,290 | 7/1952 | Goddard | 60—35.6 X |
| 2,637,973 | 5/1953 | Lawrence | 60—35.6 |
| 2,780,914 | 2/1957 | Ring | 60—35.6 |
| 2,814,929 | 12/1957 | Morley et al. | 60—35.6 |
| 2,887,844 | 5/1959 | Coty | 60—35.6 |
| 2,942,412 | 6/1960 | Bollay | 60—39.77 X |

OTHER REFERENCES

Voitsckhovsky, B. V.: "Maintained Detonations," Dokl. Akad. SSSR 129, No. 6, pp. 1254–1256 (1959).

SAMUEL LEVINE, *Primary Examiner.*

JULIUS E. WEST, ABRAM BLUM, *Examiners.*